(12) United States Patent
Waters, Jr.

(10) Patent No.: US 10,202,772 B2
(45) Date of Patent: Feb. 12, 2019

(54) SELF-ACTUATING FLOOD GUARD

(71) Applicant: Floodbreak, L.L.C., Houston, TX (US)

(72) Inventor: Louis A. Waters, Jr., Bellaire, TX (US)

(73) Assignee: Floodbreak L.L.C., Houston, TX (US)

( * ) Notice: Subject to any disclaimer, the term of this patent is extended or adjusted under 35 U.S.C. 154(b) by 0 days.

(21) Appl. No.: 15/771,175

(22) PCT Filed: Oct. 29, 2016

(86) PCT No.: PCT/IB2016/001754
§ 371 (c)(1),
(2) Date: Apr. 30, 2018

(87) PCT Pub. No.: WO2017/077396
PCT Pub. Date: May 11, 2017

(65) Prior Publication Data
US 2018/0305933 A1    Oct. 25, 2018

Related U.S. Application Data

(60) Provisional application No. 62/250,923, filed on Nov. 4, 2015.

(51) Int. Cl.
*E02B 7/20* (2006.01)
*E04F 11/02* (2006.01)
*E04F 11/04* (2006.01)
*E04H 9/14* (2006.01)
*E02B 3/10* (2006.01)

(52) U.S. Cl.
CPC .............. *E04F 11/04* (2013.01); *E04H 9/145* (2013.01); *E02B 3/104* (2013.01)

(58) Field of Classification Search
CPC ........... E04F 11/04; E04H 9/145; E03B 3/104
See application file for complete search history.

(56) References Cited

U.S. PATENT DOCUMENTS 3,731,761 A * 5/1973 Glenn ..................... E01D 15/24
                                                        182/1
3,970,169 A    7/1976 Hernandez Gonzalez
(Continued)

FOREIGN PATENT DOCUMENTS

FR    2926095 A1    7/2009
GB    2491011 A    11/2012
(Continued)

OTHER PUBLICATIONS

Thomas, S., ISA/US, PCT Recordation of Search History Mar. 28, 2017.
(Continued)

*Primary Examiner* — Benjamin F Fiorello
(74) *Attorney, Agent, or Firm* — Tim L. Burgess P.C.

(57) ABSTRACT

An upper level of a multi-level building is guarded from flooding by water present in one of the levels of the building where the upper level is reached from the lower level (or vice versa) by connecting stairs. A flight of stairs bridging the levels is buoyant and pivotally connected to the building at one end of the flight adjacent one of the levels such that on occasion of water rising originating in one of the levels, the flight rotates upward on the axis of the pivot to block water from entering the upper level.

15 Claims, 4 Drawing Sheets

(56) References Cited

U.S. PATENT DOCUMENTS

| | | | |
|---|---|---|---|
| 4,377,352 A | | 3/1983 | Goodstein |
| 5,657,832 A | * | 8/1997 | Stevens .................. B63B 27/14 |
| | | | 182/1 |
| 6,623,209 B1 | | 9/2003 | Waters, Jr. |
| 6,845,845 B2 | * | 1/2005 | Schmid, Jr. ........... E04F 11/002 |
| | | | 182/141 |
| 7,159,261 B2 | * | 1/2007 | Carrigan ................. E01D 15/24 |
| | | | 14/69.5 |
| 2003/0190193 A1 | | 10/2003 | Waters, Jr. |
| 2012/0148346 A1 | | 6/2012 | Eftekharzadeh |

FOREIGN PATENT DOCUMENTS

| | | |
|---|---|---|
| JP | 2001214425 A | 8/2001 |
| JP | 2003027855 A | 1/2003 |
| JP | 2007002641 A | 1/2007 |
| JP | 2013238091 A | 11/2013 |

OTHER PUBLICATIONS

Thomas, S.,ISA/US, International Search Report dated Apr. 13, 2017.
Thomas, S.,ISA/US, Written Opinion of International Searching Authority dated Apr. 13, 2017.

\* cited by examiner

SELF-ACTUATING FLOOD GUARD

PRIORITY CLAIM

This application claims the benefit of U.S. Provisional Patent Application 62/250,923 filed Nov. 4, 2015.

BACKGROUND OF THE DISCLOSURE

Field of Disclosure

This invention relates to barriers for guarding against entry of floodwaters into buildings.

Background

Floodwaters are a major source of property damage. On October 29 and 30, 2012 tropical storm Sandy struck New York City, its suburbs, and Long Island. Supplemented by a high tide, the storm surge was approximately 14 feet above mean low tide, overtopping seawalls and bulkheads lining Manhattan and other waterfront boroughs, flooding buildings, subway and vehicle tunnels, damaging electrical equipment, costing at least 48 lives, and in effect shutting down the City. Damages and economic losses across New York were estimated to be at least $33 billion and in neighboring New Jersey, $36.8 billion.

Doors and other grade level vertical openings can be guarded from entrance of water by gates that are self-actuating by the invention described in U.S. Pat. No. 6,623, 209. A problem is guarding a multi-level construction where vertically separated levels are accessed by stairs leading from one level to another. For example, if a lower floor has steps leading down to it from an entrance at street or ground level (for example, a basement, a lower level of a parking garage, or a storage area below a building mezzanine), and if due to the stairs and the construction of the building, the staired access to the lower level from the higher street or ground level cannot be closed by the solution given by U.S. Pat. No. 6,623,209, then on the occasion of flooding waters rising at street or ground level, the lower level will be flooded. In the case of stairs descending inside a building (for instance, a foyer) to a lower level (for instance a lower floor, which could be a basement), even if a door entrance to the stairs is protected by the solution of U.S. Pat. No. 6,623,209, water invading though a lower level such as a basement can rise though a staired access from the basement and flood the ground floor and higher levels if due to the stairs and the construction of the building the staired access cannot be closed off from the higher level by the solution of U.S. Pat. No. 6,623,209. In another problem, a raised entrance to a building may be accessed by a flight of stairs the construction of which in proximity to the entrance may prevent installation of the solution of U.S. Pat. No. 6,623, 209 to guard the entrance.

The present invention provides a self-actuating gate that allows flood prevention in a staired multi-level construction where stairs connect a lower level or floor with a higher level or floor.

BRIEF DESCRIPTION OF THE DRAWINGS

In the following detailed description of exemplary embodiments, reference is made to the accompanying drawings, which form a part hereof and in which are shown by way of illustration examples of exemplary embodiments with which the invention may be practiced. In the drawings and descriptions, like or corresponding parts are marked throughout the specification and drawings with the same reference numerals. The drawings are not necessarily to scale. Certain features of the invention may be shown exaggerated in scale or in somewhat schematic form and some details of conventional elements may not be shown in the interest of clarity and conciseness. Referring to the drawings.

DETAILED DESCRIPTION OF EMBODIMENTS

Specific details described herein, including what is stated in the Abstract, are in every case a non-limiting description and exemplification of embodiments representing concrete ways in which the concepts of the invention may be practiced. Any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments that may or may not be given therewith or elsewhere in the specification and all such embodiments are intended to be included within the scope of that term or terms. The examples serve to teach one skilled in the art to employ the present invention in virtually any appropriately detailed system, structure or manner consistent with those concepts. Language designating such non-limiting examples and illustrations includes, but is not limited to: "for example," "for instance," "e.g.," "in an embodiment." Reference throughout this specification to "an exemplary embodiment" means that a particular feature, structure, or characteristic described in connection with the embodiment is included in at least one exemplary embodiment of the present invention. Thus, the appearances of the phrase "in an exemplary embodiment" or similar expression in various places throughout this specification are not necessarily all referring to the same embodiment. Further, the particular features, structures, or characteristics may be combined in any suitable manner in one or more embodiments. Various changes and alternatives to the specific described embodiments and the details of those embodiments may be made within the scope of the invention. One or more of the elements depicted in the drawings can also be implemented in a more separated or integrated manner, or even removed or rendered as inoperable in certain cases, as is useful in accordance with a particular application. Because many varying and different embodiments may be made within the scope of the inventive concepts herein described and in the exemplary embodiments herein detailed, it is to be understood that the details herein are to be interpreted as illustrative and not as limiting the invention to that which is illustrated and described herein.

The various directions such as "upper," "lower," "back," "front," "transverse," "perpendicular", "vertical", "horizontal," "length," "height", "width," "laterally", "proximal", "distal" and so forth used in the detailed description of exemplary embodiments are made only for easier explanation in conjunction with the drawings. The components may be oriented differently while performing the same function and accomplishing the same result as the exemplary embodiments herein detailed embody the concepts of the invention, and such terminologies are not to be understood as limiting the concepts which the embodiments exemplify.

As used herein, the terms "comprises," "comprising," "includes," "including," "has," "having" or any other variation thereof, are intended to cover a non-exclusive inclusion. For example, apparatus that comprises a list of elements is not necessarily limited to only those elements but may include other elements not expressly listed or inherent to such apparatus. As used herein, the use of the word "a" or "an" when used in conjunction with the term "comprising" (or the synonymous "having" or "including" or variants of the same) in the claims and/or the specification may mean "one," but it is also consistent with the meaning of "one or more," "at least one," and "one or more than one." Further, unless expressly stated to the contrary, "or" refers to an inclusive or and not to an exclusive or. That is, unless otherwise indicated, the term "or" is generally intended to mean "and/or". For example, a condition A or B is satisfied by any one of the following: A is true (or present) and B is false (or not present), A is false (or not present) and B is true (or present), and both A and B are true (or present). In addition, as used herein, the phrase "connection to" or "connected to" means joined to, either directly or through intermediate components.

In accordance with an embodiment of the invention, one level of a construction, for example a building, is guarded from flooding water coming from another level of the construction where the levels are reached by connecting stairs. A flight of stairs bridging the levels is buoyant and one end of the flight is pivotally connected to the construction adjacent one of the levels such that on occasion of presence of water in one of the levels effective to buoy the flight, the flight rotates upward on the axis of the pivot to block water from flooding at least the part of the other level past the risen flight.

For example, in an embodiment a lower level of a construction, for instance, a basement, is guarded from flooding by rising ground or street ('upper') level water where the lower level is reached from the upper level by connecting stairs. The flight of stairs bridging the levels is buoyant and an lower end of the flight is pivotally connected to the construction adjacent the lower level such that on occasion of water rising in the upper ground or street level, the flight buoyantly rotates upward on the axis of the pivot to block water from flooding the lower level.

In another embodiment, a lower level of a multi-level construction is guarded from flooding by water entering from an upper level of the construction where the lower level is reached from the upper level (or vice versa) by connecting stairs. The flight of stairs bridging the levels is buoyant and a lower end of the flight is pivotally connected to the construction adjacent the lower level such that on occasion of water entering the lower level effective to buoy the flight, the flight buoyantly rotates upward on the axis of the pivot to block water from flooding the lower level past the rotated flight and as well can block water from any further flooding of the upper level past the rotated flight.

For another example, in an embodiment an upper level of a multi-level construction is guarded from flooding by water rising from a lower level of the construction where the upper level is reached from the lower level (or vice versa) by connecting stairs. The flight of stairs bridging the levels is buoyant and an upper end of the flight is pivotally connected to the construction adjacent the upper level such that on occasion of water rising in the lower level, the flight buoyantly rotates upward on the axis of the pivot to block water from flooding the upper level.

More particularly, in these several exemplary embodiments, a self actuating flood guard comprises a buoyant flight of steps. The flight has lower and upper ends and bridges at least an upper part of a vertical distance between lower and upper levels of a construction. The flight of steps is flanked by vertical walls alongside the flight. The walls alongside the flight prevent water from flowing around the sides of the flight. The steps block fluid communication across the flight, that is, from one side of the flight to the other side of the flight. As well known, a step comprises two members, a tread, which is the horizontal member, and a riser, the vertical member. The vertical member is not an "open" riser because the flight blocks fluid communication from one side of the flight to the other.

The flood guard includes pivotation members comprising a stationary member connected to the construction adjacent one of its levels and a moveable member moveable joined to the stationary member. The moveable member is connected to one of the ends of the flight of stairs and is pivotable about a horizontal axis transverse to the flanking vertical walls, whereby upon presence of water in one of the levels effective to buoy the flight, an end of the flight remote from the axis rotates upwardly away from the lower level. At least one restraint is configured to act on the flight and prevent the flight from rotating about the axis more than a predetermined extent when the end of the flight remote from the axis rotates upwardly away from the lower level of the construction.

In an embodiment of the invention, the flood guard restraint is connected to the construction a distance above the lower end of the flight. In an embodiment, the restraint is located at least as high as the upper level.

In an embodiment of the invention, flexible lip seal gaskets are along lateral sides of the flight of width sufficient to sealingly wipe the flanking walls and prevent significant passage of water between the lateral sides of the flight and the flanking walls.

In an embodiment of the invention, the pivotation members of the flood guard are located at an end of the flight adjacent the lower level of the construction.

In an embodiment of the invention, the pivotation members of the flood guard are located at an end of the flight adjacent the lower level and the flood guard comprises an inlet on the upper level before the flight to admit water entering the upper level into the lower level under the flight.

In an embodiment of the invention, the pivotation members of the flood guard are located at an end of the flight adjacent the lower level and the restraint is connected to the construction a distance above the horizontal axis allowing the flight to rotate to a substantially vertical orientation.

In an embodiment of the invention, the pivotation members of the flood guard are located at an end of the flight adjacent the upper level.

In an embodiment of the invention, the pivotation members are located at an end of the flight adjacent the upper level and the restraint is connected to the construction a distance above the lower level allowing the flight to rotate at least to a substantially horizontal orientation.

In an embodiment of the invention, the pivotation members are located at an end of the flight adjacent the upper level, the restraint is connected to the construction a distance above the lower level allowing the flight to rotate at least to a substantially horizontal orientation, and the construction comprises a stairwell in which the flight of stars is placed and in which the stairwell includes a wall transverse to the flanking walls. This transverse wall is spaced from the axis by a distance sufficiently equal to a run of the flight plus the tread of the last step that on rotation of the flight to the substantially horizontal orientation, water under the flight is blocked from entering the upper level. As well known a "run" of a flight of stairs is the horizontal distance from the first riser to the last riser (it is not the sum of the individual tread lengths if any part of the tread protrudes over the riser beneath, called a nose; if nosing is present, the treads overlap between treads).

In an embodiment of the invention, the pivotation members of the flood guard are located at an end of the flight adjacent the upper level and the restraint is connected to the construction a distance above the upper level allowing the flight to rotate at least to a substantially vertical orientation such that water is blocked from entering the upper level past the rotated flight.

In an embodiment of the invention in which the pivotation members of the flood guard are located at an end of the buoyant flight adjacent the upper level, the lower end of the buoyant flight rests on stationary stairs. The pivotally upwardly rotatable flight and the stationary stairs span the upper and lower levels.

Figure 2:
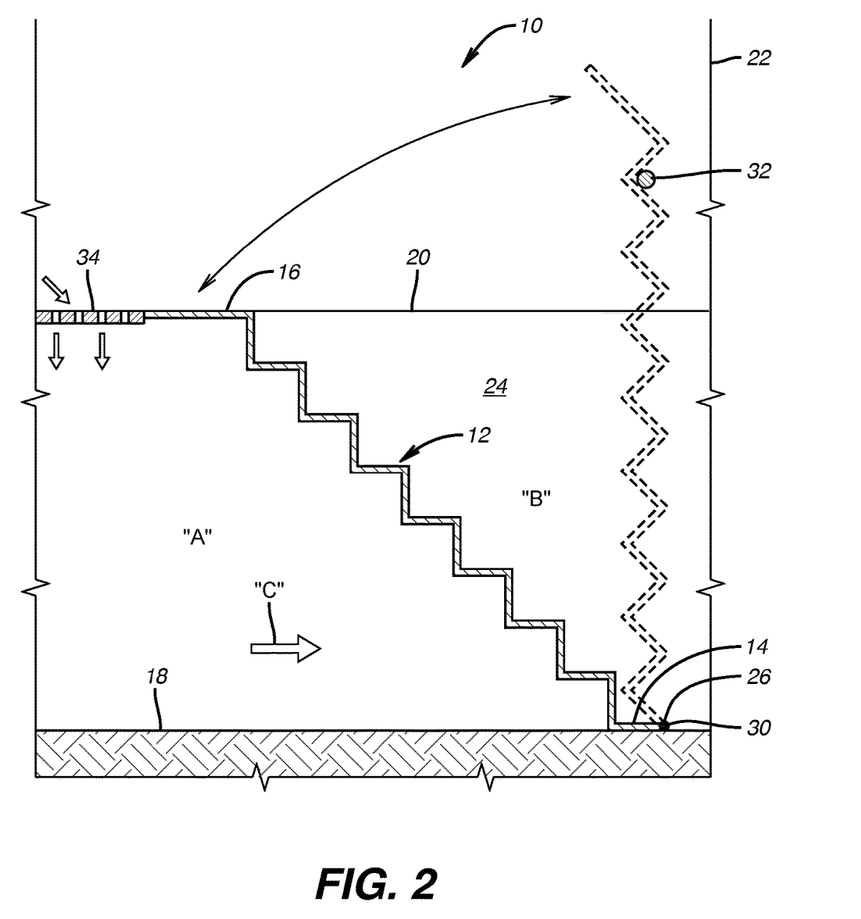
FIG. 2 is a side sectional schematic view of an exemplary embodiment of a self actuating flood guard protecting at least a portion of a lower level and a portion of an upper level of a staired multi-level construction from flooding.

In an embodiment of the invention in which the pivotation members of the flood guard are located at an end of the flight adjacent the upper level and the lower end of the flight rests on stationary stairs, and in which the flight and the stationary stairs span the upper and lower levels, an embodiment has the restraint connected to the construction a distance above said lower level and to the flight, allowing the flight to rotate at least to a substantially vertical orientation such that water is blocked from entering said upper level past the rotated flight Referring now to FIG. 2, an embodiment guards from flooding a portion of an upper level (or floor) and a portion of a lower level (or floor) (e.g., a basement), each such portion being a portion distal to a source of entry of water into the levels. The embodiment, in one instance, guards such distal portions from flood waters gaining access into the construction in a portion of an upper floor remote from the distal portions. But for the flood guard, the waters from such remote source would flood all of the upper level and cascade down stairs leading from the upper level to the lower level and flood all of the lower level. In another instance, the embodiment guards such distal portions from flood waters gaining access into the construction at a portion of the lower floor remote from the distal portion of the lower floor, and but for such embodiment, the waters would flood the distal portion of the lower level and "climb" the stairs leading from the lower level to the upper level, flooding the distal portion of the upper level.

Figure 1:
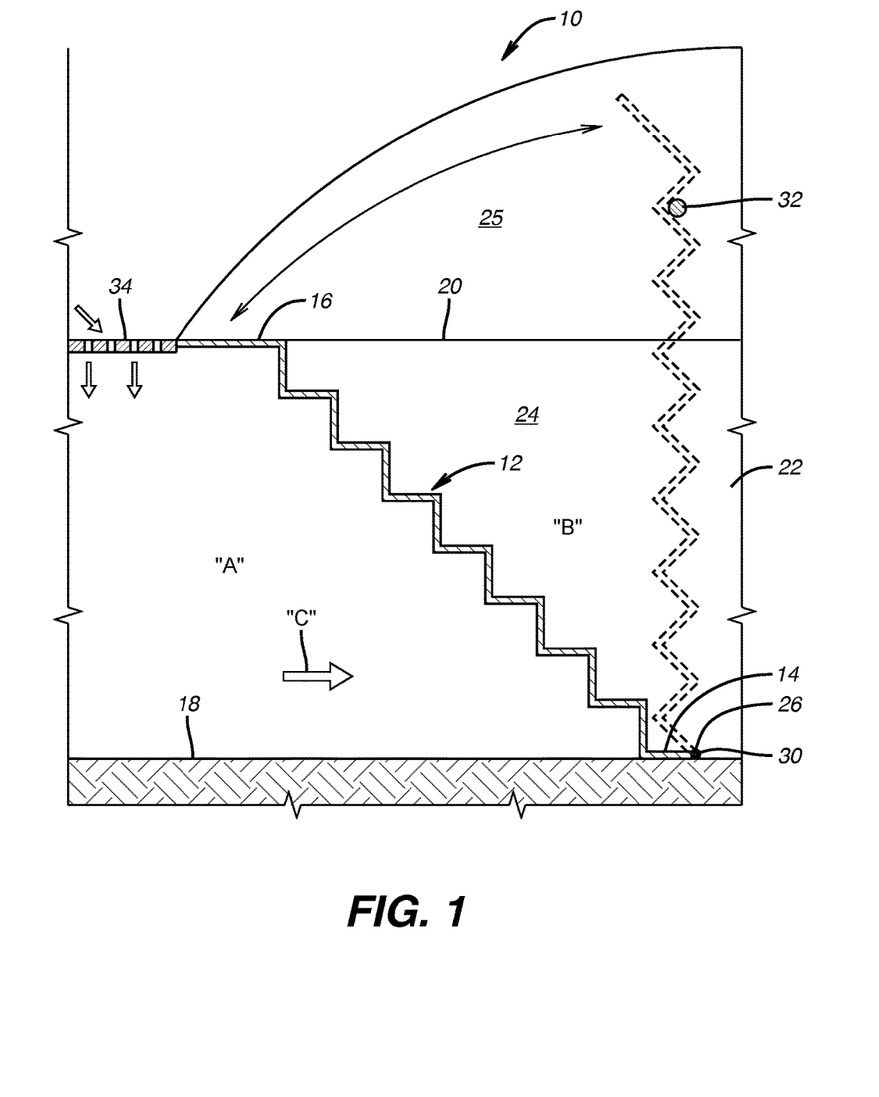
FIG. 1 is a side sectional schematic view of an exemplary embodiment of a self actuating flood guard for protecting a lower level of a construction from flooding by waters entering from an upper level.

In the embodiment of FIG. 1, a self actuating flood guard indicated generally by reference numeral 10 comprises a buoyant flight of steps 12, having a lower end 14 and an upper end 16, that bridges a vertical distance between lower level 18 and upper level 20 of a construction 22. The flight of steps 12 is flanked by vertical walls 24, 24' alongside flight 12 below level 20 and vertical walls 25, 25' above level 20. (FIG. 2 is a cross section between walls 24, 24' and 25, 25' so only walls 24 and 25 are seen.) An inlet 34 on upper level 20 of construction 22 preceding flight 12 admits waters entering upper level 20 into lower level 18 under flight 12. The steps of flight 12 block fluid communication across the flight, that is, from one side "A" of the flight to the opposite side "B" of the flight. Pivotation members 26 located at lower end 14 of flight 12 adjacent lower level 18 of construction 22 comprise a stationary member connected to construction 22 and a moveable member moveable joined to the stationary member. The moveable member is connected to lower end 14 of flight 12 and is pivotable about a horizontal axis 30 transverse to the flanking vertical walls 24, 24', whereby upon presence of water at upper level 20 entering lower level 18 though inlet 34, water present under flight 12 (indicated by arrow "C") effective to buoy flight 12 upwardly, the upper end 16 of flight 12 rotates upwardly away from lower level 18, rising above upper level 20 of the construction. The early part of the upward rotation is effected by buoyancy lifting the flight off level 18, and the later part of rotation is driven more by hydrostatic force of water impressed against the underside of flight 12. A restraint 32 is affixed to construction 22 situated to act on flight 12 to prevent flight 12 from rotating about axis 30 more than a predetermined extent when upper end 16 of flight 12 rotates upwardly away from lower level 18 of construction 22. As shown, restraint 32 is connected to construction 22 a distance above lower end 14 of flight 12 allowing the flight to rotate to a substantially vertical orientation. As shown, restraint 32 is located above upper level 20 substantially in a vertical plane in which axis 30 also resides, but restraint 32 may be located below level 20, and need not reside in such vertical plane. When end 16 of flight 12 is rotated above level 20 and all of flight 12 also rotates upwardly though vertical walls 24, 24' and 25, 25', street or ground water entering upper level 20 is prevented from entering the portion of level 18 distal to a source of water entering level 20 and admitted through inlet 34 onto level 18 below flight 12 (this distal portion is to the viewer's right of upright flight 12 in FIG. 1). Not seen in this schematic cross section, flexible lip seal gaskets along lateral sides of flight 12 have width sufficient to sealingly wipe flanking walls 24, 24' and prevent significant passage of water between the lateral sides of flight 12 and flanking walls 24, 24'.

In the embodiment of FIG. 2, using identical reference numbers for corresponding structures shown in FIG. 1, a self actuating flood guard indicated generally by reference numeral 10' comprises a buoyant flight of steps 12, having a lower end 14 and an upper end 16, that bridges a vertical distance between lower level 18 and upper level 20 of a multi-level construction 22. The flight of steps 12 is flanked by vertical walls 24, 24' alongside flight 12. (FIG. 2 is a cross section between walls 24, 24' so only one of the walls, wall 24, is seen.) Vertical walls 24, 24' extend above lower level 18 and upper level 20 in the multi-level construction 22. An inlet 34 on upper level 20 of construction 22 preceding flight 12 admits waters entering upper level 20 into lower level 18 under flight 12. The steps of flight 12 block fluid communication across the flight, that is, from one side "A" of the flight to the opposite side "B" of the flight. Pivotation members 26 located at lower end 14 of flight 12 adjacent lower level 18 of construction 22 comprise a stationary member connected to construction 22 and a moveable member moveable joined to the stationary member. The moveable member is connected to lower end 14 of flight 12 and is pivotable about a horizontal axis 30 transverse to the flanking vertical walls 24, 24', whereby upon presence of water under flight 12 (indicated by arrow "C") effective to buoy flight 12 upwardly, the upper end 16 of flight 12 rotates upwardly away from lower level 18, rising above upper level 20 of the construction. The early part of the upward rotation is effected by buoyancy lifting the flight off level 20, and the later part of rotation is driven more by hydrostatic force of water impressed against the underside of flight 12 A restraint 32 is affixed to construction 22 situated to act on flight 12 to prevent flight 12 from rotating about axis 30 more than a predetermined extent when upper end 16 of flight 12 rotates upwardly away from lower level 18 of construction 22. Restraint 32 is connected to construction 22 a distance above lower end 14 of flight 12 allowing the flight to rotate to a substantially vertical orientation. As shown in the embodiment of FIG. 2, restraint 32 is located above upper level 20 substantially in a vertical plane in which axis 30 also resides, but restraint 32 may be located below level 20, and need not reside in such vertical plane. When end 16 of flight 12 is rotated above level 20, the portion of level 20 distal to a source of water entering level 20 (to the right of upright flight 12 as viewed in FIG. 2) is prevented from receiving additional water from that source that does not rise to a level topping end 16 of flight 12, either during rise from level 20 or when flight 12 is fully elevated. Not seen in this schematic cross section, flexible lip seal gaskets along lateral sides of flight 12 have width sufficient to sealingly wipe flanking walls 24, 24' and prevent significant passage of water between the lateral sides of flight 12 and flanking walls 24, 24'.

Figure 3:
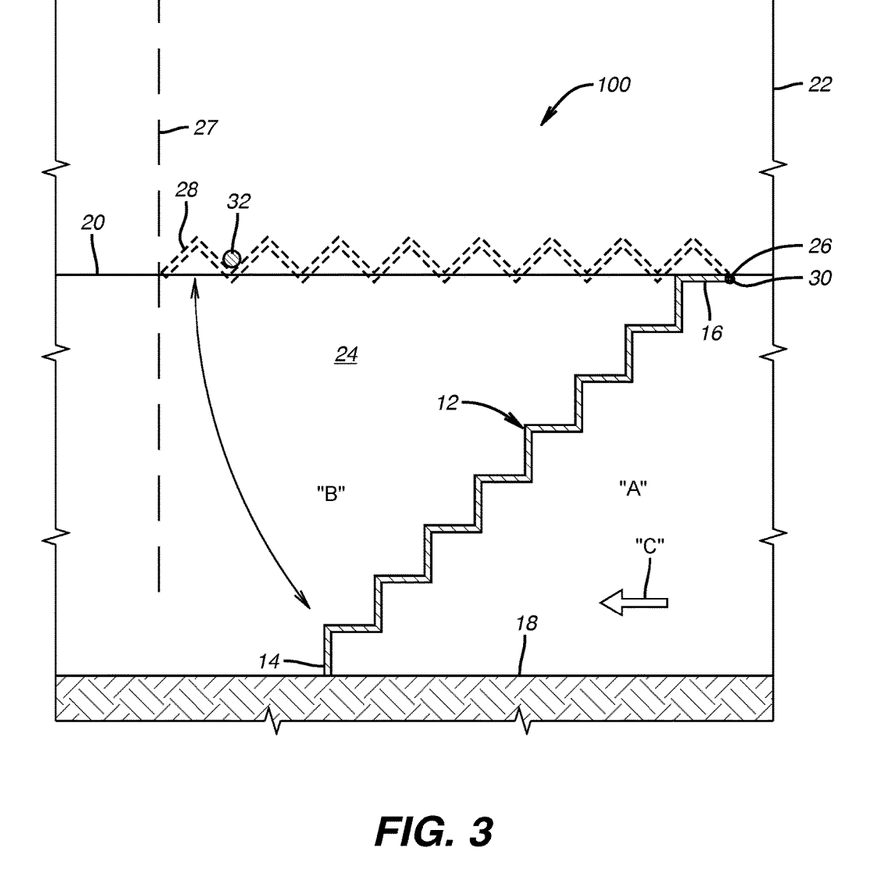
FIG. 3 is a side sectional schematic view of an exemplary embodiment of a self actuating flood guard protecting an upper level of a staired multi-level construction from flooding.

Referring now to FIG. 3, an embodiment guards all or at least a portion of an upper level (or floor) of multi-level construction 22 from flood waters gaining access into the construction in a lower level that but for the flood guard would climb stairs leading from the lower level to the upper level and flood the upper level. In FIG. 3 using identical reference numbers to corresponding structures shown in FIGS. 1 and 2, a self actuating flood guard indicated generally by reference numeral 100 comprises a buoyant flight of steps 12 having a lower end 14 and an upper end 16 and bridges a vertical distance between lower level 18 and upper level 20 of a multi-level construction 22. The flight of steps 12 is flanked by vertical walls 24, 24' alongside flight 12. Vertical walls 24, 24' extend at least above lower level 18 to upper level 20. Like FIGS. 1 and 2, FIG. 3 is a cross section between walls 24, 24' so only one of the walls, wall 24, is seen. The steps of flight 12 block fluid communication across the flight, that is, from one side "A" of the flight to the opposite side "B" of the flight. Pivotation members 26 located at upper end 16 of flight 12 adjacent upper level 20 of construction 22 comprise a stationary member connected to construction 22 and a moveable member moveable joined to the stationary member. The moveable member is connected to upper end 16 of flight 12 and is pivotable about a horizontal axis 30 transverse to the flanking vertical walls 24, 24', whereby upon entry of water onto level 18 (indicated by exemplary arrow "C") effective to buoy flight 12, the lower end 14 of flight 12 buoyantly rotates upwardly away from lower level 18 of construction 22. A restraint 32 is affixed to construction 22 situated to act on flight 12 to prevent flight 12 from rotating about axis 30 more than a predetermined extent when lower end 14 of flight 12 buoyantly rotates upwardly away from lower level 18 of construction 22. In FIG. 3, restraint 32 is connected to construction 22 a distance above lower end 14 of flight 12 allowing the flight to rotate to a substantially horizontal orientation.

In an embodiment, construction 22 depicted in FIG. 3 comprises a stairwell in which the flight of stars 12 is placed and in which the stairwell includes a wall 27 (indicated by dashed lines) transverse to flanking walls 24, 24', which extend above level 20. Wall 27 is spaced from axis 30 by a distance sufficiently equal to the run of flight 12 that on rotation of flight 12 to substantially horizontal orientation, water in lower level 18 is blocked from entering upper level 20. In another embodiment, restraint 32 is connected to construction 22 a distance above lower level 18 allowing flight 12 to rotate at least to a substantially vertical orientation, as in FIG. 2, such that water is blocked from entering a portion of upper level 20, for example, a hallway, past the vertically rotated flight 12. Not seen in this schematic cross section, flexible lip seal gaskets along lateral sides of flight 12 have width sufficient to sealingly wipe flanking walls 24, 24' and prevent significant passage of water between the lateral sides of flight 12 and flanking walls 24, 24'.

Figure 4:
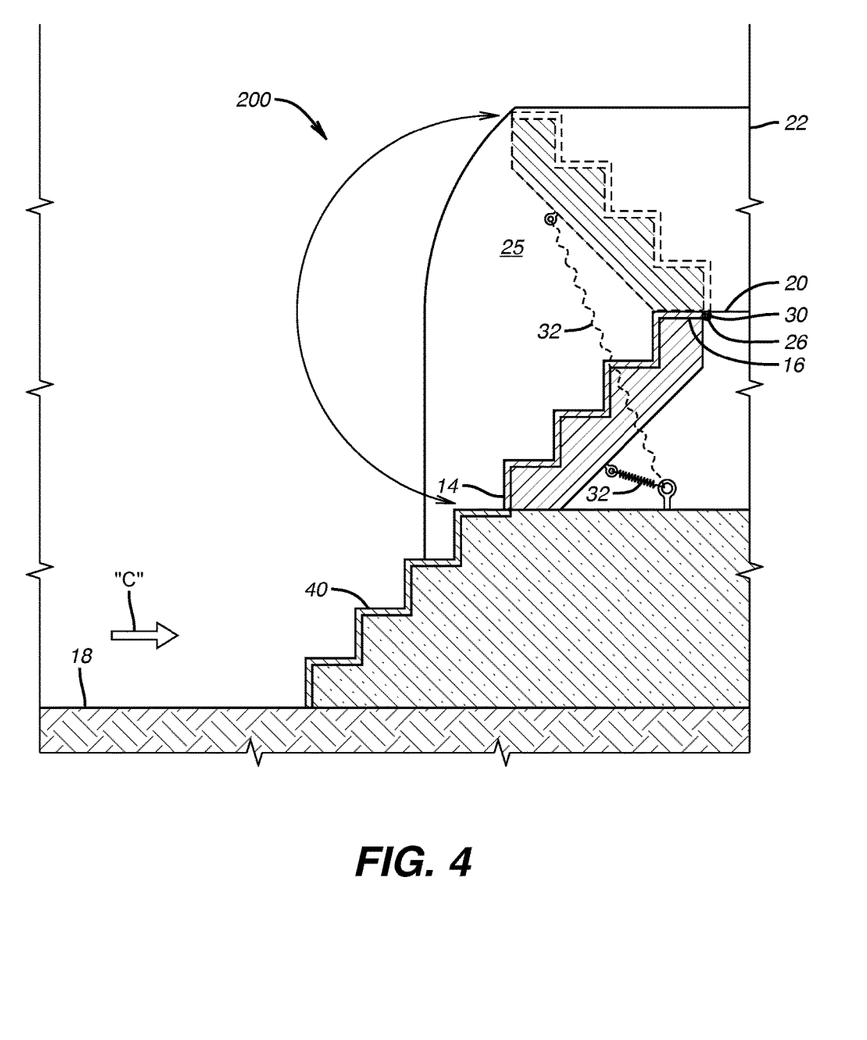
FIG. 4 is a side sectional schematic view of another exemplary embodiment of a self actuating flood guard protecting an upper level of a staired multi-level construction from flooding

Referring to FIG. 4, another embodiment 200, is depicted. It guards an upper level (or floor) of a construction from flood waters rising from a lower level to the upper level of a construction in which steps lead from the lower level (for example, but not limited to, ground level) to the upper level (which might be the first floor or ground floor of a building) where but for the flood guard the rising waters would flood the upper level. In FIG. 4, the same reference numerals employed in FIGS. 1-3 are used to indicate corresponding members. Construction 22 above level 20 may be an entrance of a building. Pivotation members 26 are located at an upper end 16 of 12 flight adjacent upper level 20 of construction 22. The lower end 14 of a flight 12 rests on stationary stairs 40. Flight 12 and stationary stairs 40 span upper and lower levels 18 and 20 respectively and provide access from lower level 18, which may be at ground level, to upper level 20, suitably into an entrance of a building construction 22 fronted by the stairs. On rise of water in front of the stairs buoying up flight 12, end 14 of flight 12 remote from axis 30 rotates upwardly away from stationary stairs 40 on lower level 18. A restraint 32 is connected both to construction 22 a distance above lower level 18 and to flight 12, allowing flight 12 to rotate to a substantially vertical orientation wiping walls 25, 25' during rotation such that water is blocked from entering upper level 20 past rotated flight 12 (extended restraint 32 shown in dashed lines). Like FIGS. 1-3, FIG. 4 is a cross section between walls 25, 25' so only one of the walls, wall 25, is seen. Like FIGS. 1-3, flexible lip seal gaskets (not seen in this schematic cross section) along lateral sides of flight 12 have width sufficient to sealingly wipe flanking walls 25, 25' and prevent significant passage of water between the lateral sides of flight 12 and flanking walls 25, 25'.

Accordingly, in operation, construction 22, for example, a multi-level building, is guarded from flooding from a different level (18 or 20) of construction 22 accessed by stairs, by a method comprising providing a buoyant flight of steps having an lower end 14 and an upper end 16 and bridging at least an upper part of a vertical distance between lower level 18 and upper level 20 of building 22, flight 12 being flanked by vertical walls 24, 24' alongside flight 12, the steps in flight 22 blocking fluid communication across the flight; additionally providing pivotation members 26 comprising a stationary member connected to construction 22 adjacent one of the levels (18 or 20) and a moveable member moveable joined to the stationary member, the moveable member being connected to one of the ends (14 or 16) of flight 12 and pivotable about a horizontal axis 30 transverse to vertical walls 24, 24', whereby upon presence of water in one of the levels 18 or 20, effective to buoy flight 12, an end (14 or 16) of the flight 12 remote from axis 30 rotates upwardly away from lower level 18 of construction 22; and further providing at least one restraint 32 configured to prevent flight 12 from rotating about axis 30 more than a predetermined extent when the end (14 or 16) of flight 12 remote from axis 30 rotates upwardly away from lower level 18 of construction 22.

It will be appreciated that one or more of the elements depicted in the figures can also be implemented in a more separated or integrated manner, or even removed or rendered as inoperable in certain cases, as is useful in accordance with a particular application. Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

The invention claimed is:

1. A self actuating flood guard comprising:
   a buoyant flight of steps having lower and upper ends and bridging at least an upper part of a vertical distance between lower and upper levels of a construction, said flight being flanked by vertical walls alongside the flight, said steps in said flight blocking fluid communication across the flight,
   pivotation members comprising a stationary member connected to said construction adjacent one of said levels and a moveable member moveable joined to said stationary member, said moveable member being connected to one of said ends of said flight and pivotable about a horizontal axis transverse to said vertical walls, whereby upon presence of water at one of said levels effective to buoy said flight, an end of the flight remote from said axis rotates upwardly away from said lower level of the construction, and
   at least one restraint configured to prevent the flight from rotating about said axis more than a predetermined extent when said end of said flight remote from said axis rotates upwardly away from said lower level of the construction.

2. The flood guard of claim 1 in which said restraint is connected to the construction a distance above said lower end of said flight.

3. The flood guard of claim 1 further comprising flexible lip seal gaskets along lateral sides of the flight of width sufficient to sealingly wipe said flanking walls and prevent significant passage of water between the lateral sides of the flight and the flanking walls.

4. The flood guard of claim 1 in which said pivotation members are located at said lower end of said flight adjacent said lower level of the construction.

5. The flood guard of claim 4 comprising an inlet on said upper level to admit water entering said upper level into said lower level.

6. The flood guard of claim 4 in which said restraint is connected to the construction a distance above said horizontal axis allowing the flight to rotate to a substantially vertical orientation.

7. The flood guard of claim 1 in which said pivotation members are located at said upper end of said flight adjacent said upper level.

8. The flood guard of claim 7 in which said restraint is connected to the construction a distance above said lower level allowing the flight to rotate at least to a substantially horizontal orientation.

9. The flood guard of claim 8 in which said construction comprises a stairwell in which said flight of stars is placed and in which said stairwell includes a wall transverse to said flanking walls and spaced from said axis a distance sufficiently equal to a run of the flight plus the tread of the last step of the flight that on rotation of the flight to said substantially horizontal orientation, water under said flight is blocked from entering said upper level.

10. The flood guard of claim 7 in which said restraint is connected to the construction a distance above said upper level allowing the flight to rotate at least to a substantially vertical orientation such that water is blocked from entering said upper level past said rotated flight.

11. The flood guard of claim 7 in which said lower end of said flight rests on stationary stairs, said flight and said stationary stairs spanning said upper and lower levels.

12. The flood guard of claim 11 in which said restraint is connected to the construction a distance above said lower level and to said flight, allowing the flight to rotate at least to a substantially vertical orientation such that water is blocked from entering said upper level past said rotated flight.

13. A method of guarding one level of a multi-level construction from flooding by water from another level of the construction where the levels are reached by connecting stairs, comprising:
   providing a buoyant flight of steps having lower and upper ends and bridging at least an upper part of a vertical distance between lower and upper levels of a said building and flanked by vertical walls alongside the flight, said steps in said flight blocking fluid communication across the flight,
   providing pivotation members comprising a stationary member connected to said construction adjacent one of said levels and a moveable member moveable joined to said stationary member, said moveable member being connected to one of said ends of said flight and pivotable about a horizontal axis transverse to said vertical walls, whereby upon presence of water in one of said levels effective to buoy said flight, an end of the flight remote from said axis rotates upwardly away from said lower level of the construction, and
   providing at least one restraint configured to prevent the flight from rotating about said axis more than a predetermined extent when said end of said flight remote from said axis rotates upwardly away from said lower level of the construction.

14. The method of claim 13 in which said pivotation members are located at said lower end of said flight adjacent said lower level of the construction.

15. The method of claim 13 in which said pivotation members are located at said upper end of said flight adjacent said upper level of the construction.

* * * * *